Oct. 27, 1942.  E. W. CAMPBELL  2,300,203
WELDING TORCH
Filed June 14, 1941  2 Sheets-Sheet 1
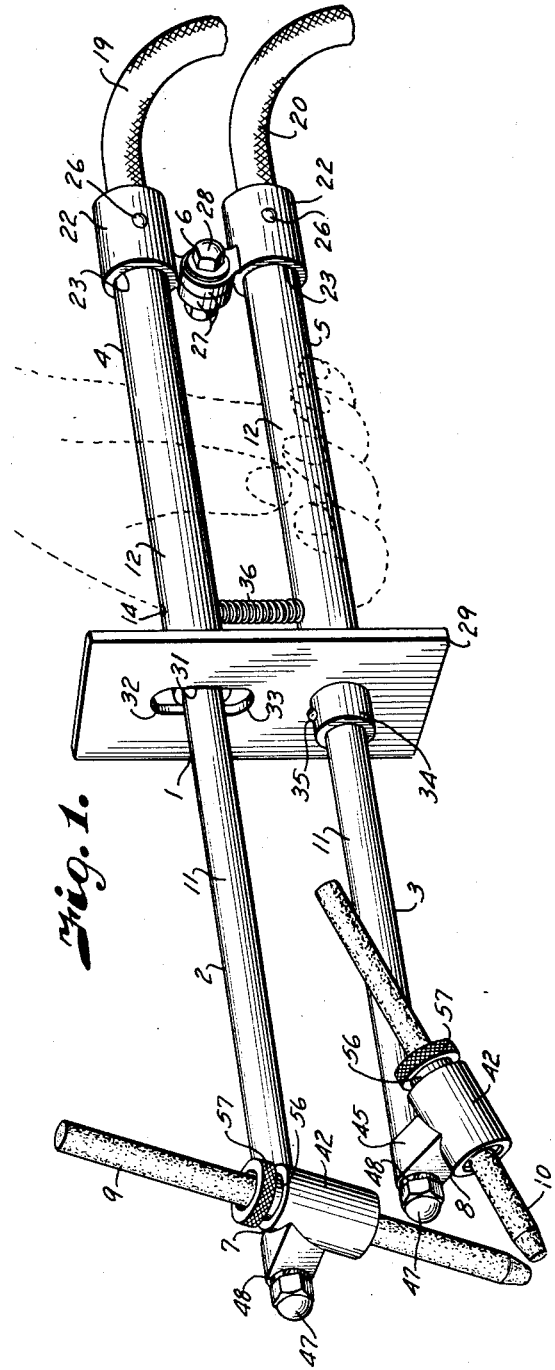
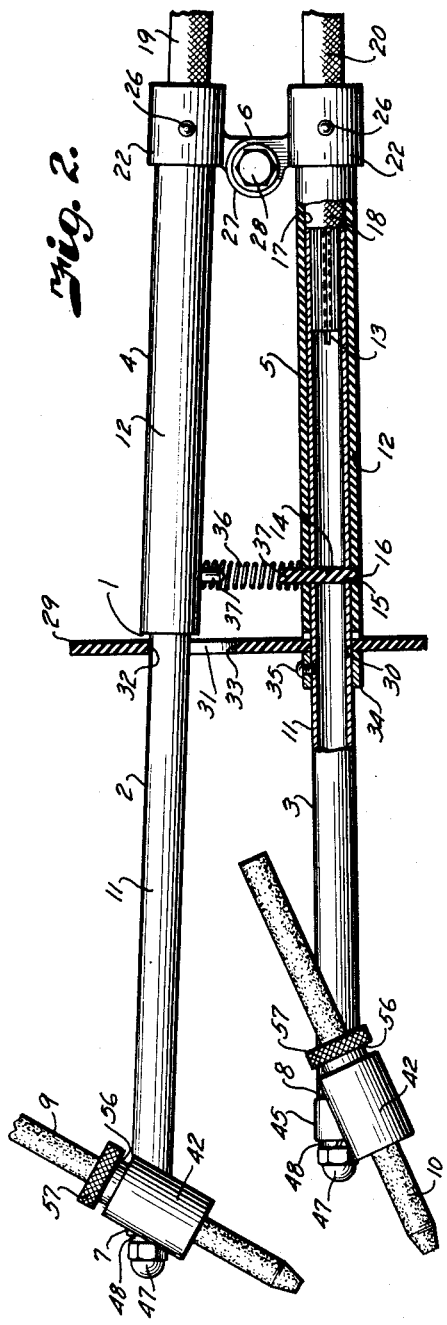
INVENTOR
Edgar W. Campbell.
BY
ATTORNEY Oct. 27, 1942.     E. W. CAMPBELL     2,300,203
WELDING TORCH
Filed June 14, 1941     2 Sheets-Sheet 2
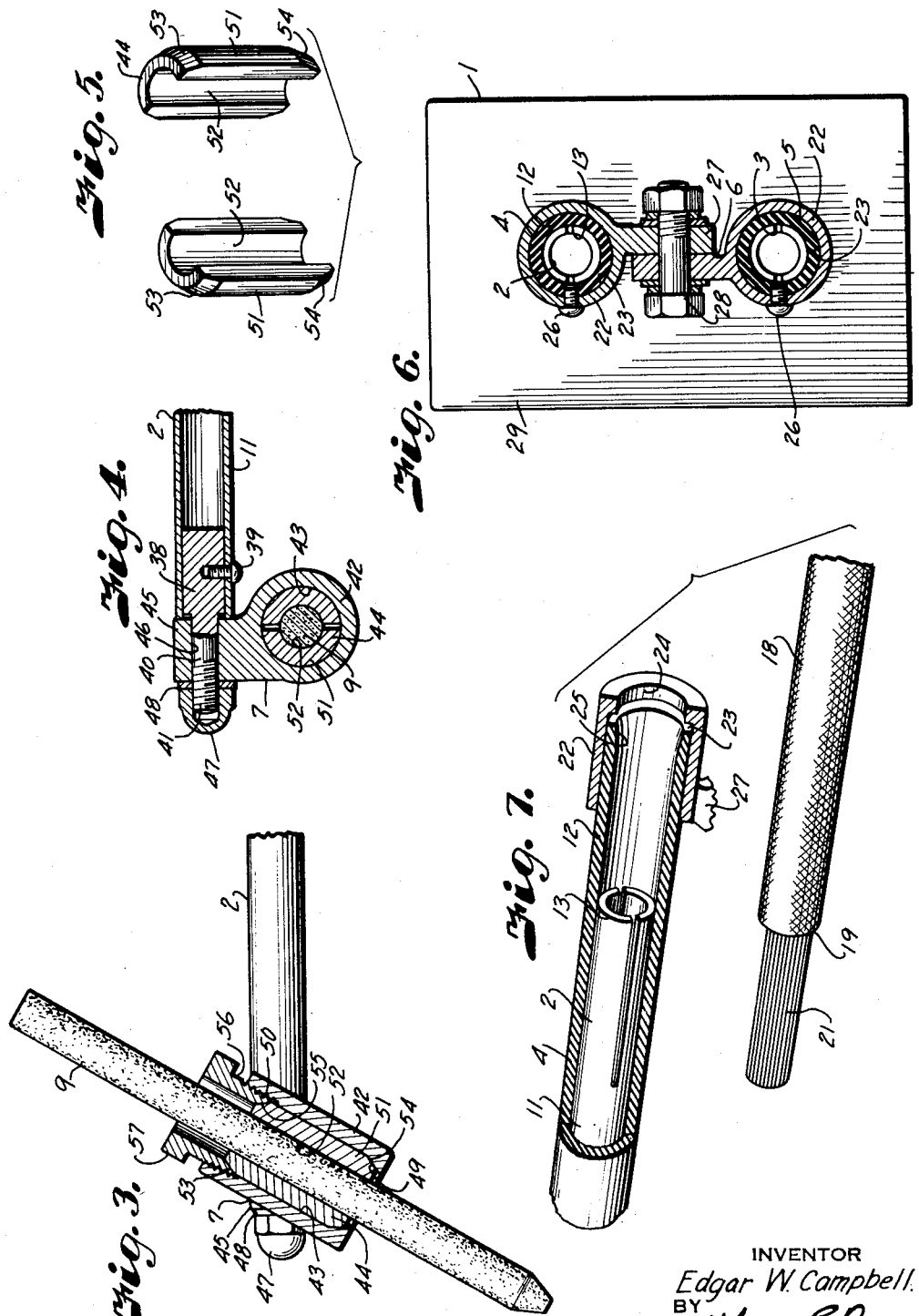
INVENTOR
Edgar W. Campbell.
BY
Arthur Le Brown
ATTORNEY

UNITED STATES PATENT OFFICE 2,300,203

WELDING TORCH

Edgar W. Campbell, Kansas City, Mo., assignor to Hammett Manufacturing Company, Kansas City, Mo., a corporation of Missouri Application June 14, 1941, Serial No. 398,136

4 Claims. (Cl. 219—14)

This invention relates to welding torches, particularly those of the electric carbon type wherein an arc is drawn between a pair of electrodes, and has for its principal object to provide an electrode mounting by which the electrodes may be readily adjusted to and from each other through pressure of the operator's hand and the adjustment steadily maintained when drawing an arc flame of the desired size and intensity.

Other objects of the invention are to provide an electric carbon torch of simple, inexpensive construction; to provide a fixed hinge connection between the electrode holders or arms for maintaining accurate control of the electrode spacing; to provide an electrode holder for reflecting radiant heat of the arc so that the handle elements of the holder arms are maintained in cool condition; to provide the electrode holders with collets designed to maintain uniform contact and gripping pressure throughout the length thereof; to provide the welding torch with a shield forming a stop to limit extent of movement of the electrode holders to and from each other; and to provide a welding torch with electrode collars having substantially universal mounting for facilitating angular adjustment of the electrodes.

In accomplishing these and other objects of the invention, I have provided improved structure, the preferred form of which is illustrated in the accompanying drawings, wherein:

Fig. 1 is a perspective view of a welding torch constructed in accordance with the present invention.

Fig. 2 is a side elevational view of the torch, parts of which are in section to better illustrate the construction.

Fig. 2 is a section through one of the electrode rod retaining collets and its supporting collar.

Fig. 4 is a section through one of the electrode holders, illustrating the pivotal mounting of the collet retaining collar.

Fig. 5 is a perspective view of one of the collets.

Fig. 6 is a cross-section through the hinge connection of the electrode holders.

Fig. 7 is a perspective sectional view of one of the handle elements, particularly illustrating the construction of the socket for receiving the terminal of one of the electrical cables whereby an electrical current is supplied to the torch.

Referring more in detail to the drawings:

1 designates an electrical carbon welding torch including a pair of arm-like electrode holders 2 and 3, having handles 4 and 5 connected together by a hinge connection 6. The outer ends of the holders carry collet retaining collars 7 and 8 securing the carbon electrode rods 9 and 10.

The electrode holders are of similar construction and each includes a tubular metal body 11, capable of conducting an electric current.

Each of the handles 4 and 5 includes a tube 12 formed of insulating material and having an inner diameter to receive split ends 13 of the tubes 11 snugly and which are fixed therein by pins 14 extending through registering openings 15 and 16 of the tubes, as shown in Fig. 2. The ends 13 of the tubes 11 terminate short of the rear ends of the handle tubes to provide sockets 17 for receiving insulating covering 18 of conductor cables 19 and 20 when terminals 21 of the conductors engage in the slotted ends of the tubes 11.

Fixed to the rear ends of the respective handle elements are ferrules 22 having sockets 23 of a diameter to receive the rear ends of the tubes 12 and have openings 24 coaxial with the sockets 17 of the handle elements. The entrance ends of the sockets 17 are slightly belled, as at 25, for facilitating insertion of the cable terminals. With this arrangement, it is obvious that the insulation on the cables cooperates with the handle elements for insulating the ferrule members 22. The ferrule members are secured in position on the handle elements by fastening devices, such as drive screws 26. Extending from each ferrule is an ear 27 slightly offset from a plane passing through the axes of the ferrules so that when the ears are placed together and secured by a pivot member, such as a bolt 28, the holders 2 and 3 are supported with their axes in a common plane.

The handle portion of the torch carries a shield 29 comprising a flat plate formed of insulating material and having an opening 30 therein to pass the tubular portion of the holder 3 and having a slotted opening 31 to accommodate the holder 2 as shown in Fig. 1, the slot 31 being of sufficient length so that the ends 32 and 33 thereof form stops to limit movement of the holders on the hinge member 28. The shield is retained in contact with one of the handle elements by a collar 34 sleeved over the member 11 and secured by a fastening device 35. In order to retain the holders in spaced relation, the torch is provided with a coiled spring 36 having its ends engaged over projecting ends 37 of the pins 14, previously described.

The tubular body 11 for the holder 2 is of slightly longer length than that of the holder 3, as shown in Fig. 2, to provide proper positioning of the electrode rods, later described. Received in the outer end of each tubular body 11 is a head 38 tightly engaging within the bore thereof and secured by a fastening device 39. Extending axially of the heads and projecting from the ends of the tubular bodies are stems 40 having threaded ends 41 as shown in Fig. 4.

The electrode collars 7 and 8 are carried by the stems 40 and each includes a ring-like body 42 having an axial bore 43 of suitable diameter to accommodate the collets 44 which grip the electrode rods 9 and 10. Extending laterally from the ring-like bodies of the respective collars are lugs 45 having openings 46 therethrough to receive the stems 40 whereby the collars are pivotally mounted for arcuate movement about the axes of the holders 2 and 3. The lugs are retained in abutting engagement with the ends of the holders by nuts 47 which are turned onto the threaded ends of the stems and engage lock washers 48 to prevent rotation of the collars on the holders after they have been adjusted thereon. The lug for the holder of longer length is arranged at a differential angle to that of the lug on the other collar so that the axes of the collars intersect as shown in Fig. 2 and the points of the electrode rods 9 and 10 approach each other when the holders are moved together against action of the spring 36. The bores of the collars terminate in tapered annular shoulders 49 and the opposite ends have internal threads 50.

The collets are best illustrated in Fig. 5, and each is shown as including a substantially semi-cylindrical jaw 51 having a gripping face 52 conforming in diameter to the diameter of the electrode rod and having an outer diameter freely engageable within the bore of the collar. The respective ends of the collets are bevelled or tapered, as at 53 and 54. When the collets are inserted in the collars the bevels 53 engage the shoulders 49 and the bevels 54 are in position to be engaged by tapered annular shoulders 55 of bushings 56 which are threaded into the threaded ends of the collars as shown in Fig. 3. The bushings 56 are provided with knurled flanges 57 so that they may be readily applied and moved into engage with the collets whereby the collets are drawn into gripping engagement with the electrode rods supported thereby. With this construction the collets are caused to engage the electrode rods uniformly along the entire length thereof so as to retain the rods firmly and uniformly distribute pressure acting thereon. The construction also permits of removal and insertion of other collets of the proper size for the electrode rods to be used for a given work.

In order to prevent heating of the metal parts of the torch through heat radiated from an arc drawn between the electrode rods, the exposed surfaces of the metal parts are polished or plated to form reflecting surfaces capable of reflecting the radiant heat.

In using the torch constructed and assembled as described, collets of the proper size are inserted in the respective collars so that the inner bevelled ends thereof engage the shoulders 49. The bushings 56 are then applied but the collets are left sufficiently loose that the carbon electrode rods may be slid therethrough and positioned so that the points thereof will engage each other. The bushings 56 are then tightened to retain the rods in proper position. The terminals of the electric cables are inserted in their respective sockets by passing them through the open ends of the ferrules.

With the torch held in the hand as shown in Fig. 1, the electrodes are moved toward each other by applying a gripping pressure until the carbon points contact. This establishes an electrical short and the points heat. The grip is then released slightly to permit the points to part and establish an arc flame. Control of this flame is readily effected by varying grip of the hand and a given arc can be maintained to suit the character of the work.

Attention is drawn to the fact that the fixed pivotal connection between the electrode holders retains the points of the electrodes in fixed relation so that the proper spacing is readily maintained to effect the desired arc. The shield protects the operator's hand from heat of the arc flame and also forms limit stops to retain the proper relation of the holders. The highly polished surfaces of the electrode holders and collars reflect radiant heat of the flame and prevent overheating of the holders so that the holders and handle elements thereof are retained in cool condition even after the torch has been used for a considerable period of time.

From the foregoing it is obvious that I have provided a welding torch that is of simple and inexpensive construction and which permits maintenance of an arc of desired intensity during a welding or heating operation.

What I claim and desire to secure by Letters Patent is:

1. A device of the character described including, a pair of electrode holders having handle portions at one end, electrode rod supporting means at the other end of the electrode holders, electrodes in said supporting means, a hinge connecting the holders adjacent the handle portions, and having a hinging axis fixed with respect to the holders to maintain a predetermined registry of the electrodes when the electrode holders are moved to and from each other on said hinging axis, a shield fixed to one of the electrode holders and having a slot passing the other electrode holder for limiting movement of the electrode holders on said hinge connection, and a spring between the shield and hinge and having action to normally urge the electrode holders apart.

2. A device of the character described including, a pair of electrode holders having handle portions at one end, electrode rod supporting means at the other, a hinge connecting the electrode holders adjacent outer ends of the handle portions, and a shield fixed to one of the electrode holders adjacent the end of the handle portion opposite the hinge and having a slot passing the other electrode holder for limiting movement of the electrode holders on said hinge connection.

3. A device of the character described including, a pair of electrode holders having tubular body portions forming socket-like ends for receiving the terminals of electrical cables, insulating tubes sleeved over the socket-like ends, ferrules on the insulating tubes having laterally extending ears, a pivot member extending through said ears, a spring interconnecting the electrode holders for moving the electrode holders in one direction on said pivot member, a shield fixed to one of the electrode holders and having means for limiting movement of the other electrode holder responsive to said spring, and means carried by the electrode holders for supporting electrode rods.

4. A device of the character described including, a pair of electrode holders having handle portions at one end, electrode rod supporting means at the other end of the electrode holders, electrodes in said supporting means, a hinge connecting the holders adjacent the handle portions, a shield fixed to one of the electrode holders and having a slot passing the other electrode holder for limiting movement of the electrode holders on said hinge connection, and a spring between the shield and hinge and having action to normally urge the electrode holders apart.

EDGAR W. CAMPBELL.